United States Patent [19]

Plaat

[11] 3,990,547
[45] Nov. 9, 1976

[54] BRAKE RETRACTOR MECHANISM
[75] Inventor: Cornelius Lucas Plaat, Troy, Ohio
[73] Assignee: The B. F. Goodrich Company, Akron, Ohio
[22] Filed: Sept. 4, 1975
[21] Appl. No.: 610,241

[52] U.S. Cl. ............................ 188/196 R; 188/71.8; 192/111 A
[51] Int. Cl.² ........................................ F16D 65/54
[58] Field of Search ........... 188/71.8, 196 P, 196 R; 192/111 A

[56] References Cited
UNITED STATES PATENTS

| | | |
|---|---|---|
| 3,542,165 | 11/1970 | Lucien .......................... 188/196 P |
| 3,903,999 | 9/1975 | Ditlinger ........................ 188/196 R |

Primary Examiner—Duane A. Reger
Attorney, Agent, or Firm—William A. Shira, Jr.; Frederick K. Lacher

[57] ABSTRACT

A brake retractor assembly in which the automatic adjustment apparatus includes a perforated drag tube and a ball carried by an adjusting pin engageable with the tube. The ball is slightly larger than the inside diameter of the tube so that as the brake wears the ball is forced into the tube causing successive sections between the perforations to rupture and provide the necessary adjustment for wear.

10 Claims, 5 Drawing Figures

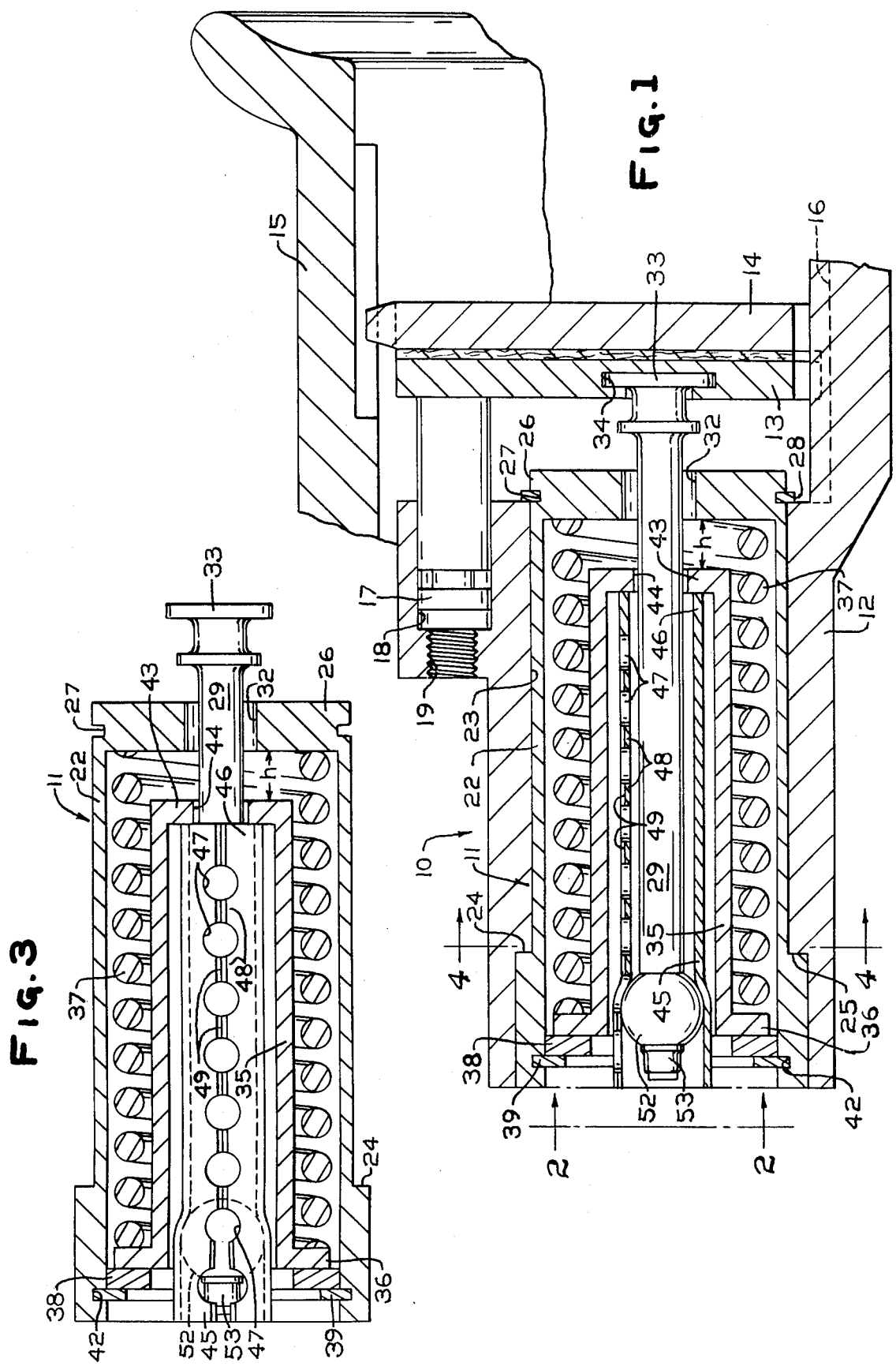

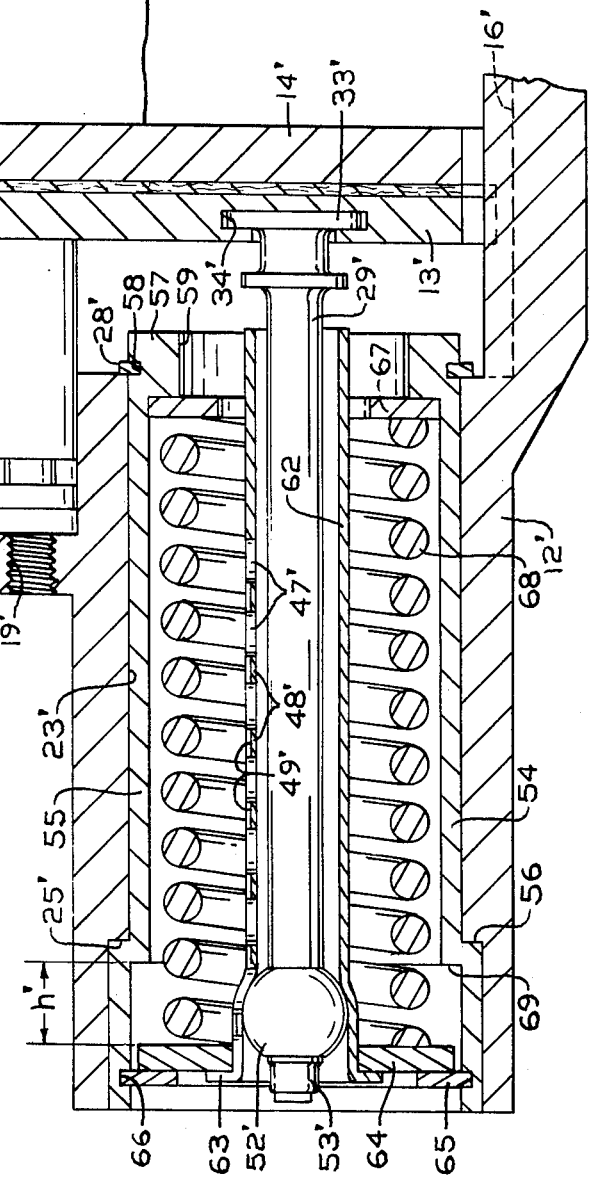
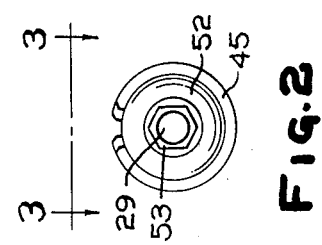
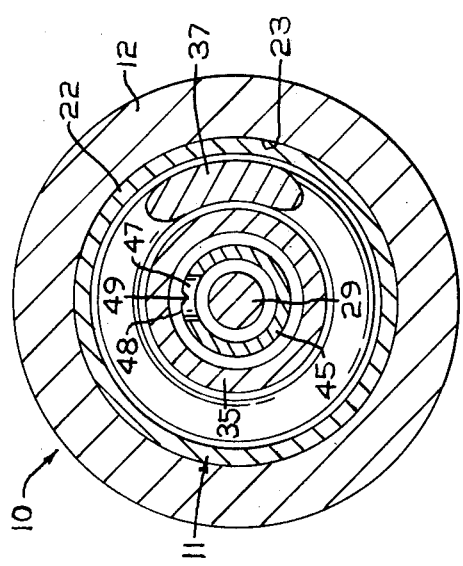

BRAKE RETRACTOR MECHANISM

BACKGROUND OF THE INVENTION

This invention relates to adjusting mechanism for automatically maintaining a uniform release clearance (and therefore a uniform actuating stroke) for brakes and similar equipment. Mechanisms of this type are commonly used in brake systems to compensate for wear of the brake linings and other brake parts and are popularly called "automatic brake adjusters". Although the present invention is explained here in connection with brakes the mechanism has utility in other environments where similar wear compensation is needed such as in clutches.

The basic adjuster designs have included mechanical adjusters with special ratchets or friction dragging parts to provide the adjustment for wear. Hydraulic adjusters utilizing the metering of hydraulic fluid and adjusters with deformable tubes have also been used.

The adjusters in which an enlarged deforming member is pulled through a ductile deformable tube have the advantage of low cost and reliability. Problems with this type of adjuster have included providing the tube with a sufficient wall thickness to carry compressive or tensile loads while at the same time reducing the wall thickness to a minimum so that it can be used on brakes where the adjusting force is low. The interdependency of the predetermined yield strength of the tube and the required tensile or compressive yield strength has limited the use of this type of adjusters to applications where the adjusting force is high. There has also been a problem in providing different adjustment load levels with the same adjuster because this has necessitated changing dimensions of the tube such as the wall thickness and diameter or it has required a different tube material.

SUMMARY OF THE INVENTION

The brake adjuster assembly of the present invention includes a tube which can be made to withstand the required compressive or tensile loads independent of the yield strength of the tube. The material of which the tube is made need not have special ductility for expansion and the same tube with minor changes can be used for adjusters where the adjusting force is low and where it is high. Also crack propagation is limited.

Progressive axial movement of a ball in the tube results in successive stressing and rupturing of "tensile bar" sections between perforations in the tube. The rupture strength of the tube is relatively independent of the tube wall thickness and instead depends more on the minimum cross section of the "tensile bar" section. This cross section is a function of the distance between perforations in the tube wall and the thickness of the wall which can be varied by scoring of the sections or by changing the size of the perforations.

The accompanying drawings show one preferred form and a modification of a brake retractor made in accordance with and embodying this invention and which are representative of how this invention may be practiced.

BRIEF DESCRIPTION OF THE DRAWINGS

In the drawings:

FIG. 1 is a longitudinal cross section of the adjuster assembly installed in a typical disc brake, the assembly being in the condition its parts occupy when the brake is retracted or released and the brake parts being shown in generalized or somewhat schematic form with some parts being broken away.

FIG. 2 is an end view of the ball and tube assembly taken along the plane of line 2—2 of FIG. 1.

FIG. 3 is a sectional view like FIG. 1 of the adjuster assembly showing a plan view of the tubular member taken along the plane of line 3—3 of FIG. 2.

FIG. 4 is a sectional view taken along the plane of line 4—4 of FIG. 1.

FIG. 5 is a view like FIG. 1 showing a modified adjuster assembly.

DETAILED DESCRIPTION

A brake retractor 10 including an adjuster assembly 11 is shown in FIG. 1 mounted rigidly in a torque frame 12 of a brake. In this embodiment the torque frame 12 carries a splined disc 13 in parallel axial alignment with a rotatable lining carrier 14. The latter is in splined engagement at its outer periphery with a rotating member which may be a wheel 15 of a vehicle or aircraft on which the brake is mounted. The splined disc 13 is also in splined engagement at its inner periphery with keyways 16 connected to the torque frame 12.

The brake is actuated and the splined disc 13 is engaged by a hydraulic piston 17 mounted in a cylinder 18 in the torque frame 12. A threaded port 19 in the frame 12 leading to the cylinder 18 may be connected to a source of hydraulic pressure for actuating the piston 17 to urge the splined disc 13 against the lining carrier 14 and bring other engageable parts of the brake (not shown) into frictional engagement to reduce the rotation or bring the wheel 15 to a complete stop. The brake retractor 10 as shown in FIG. 1 is in the retracted condition with the splined disc 13 and lining carrier 14 in the released condition where there is little if any frictional engagement and no pressure is exerted by the piston 17 against the splined disc 13.

The adjuster assembly 11 shown in FIGS. 1 through 4 includes a cylindrical housing 22 which is adapted for mounting in a cylindrical opening 23 in the torque frame 12. The housing 22 may have a flange 24 at one end for engaging a shoulder 25 of the housing in the opening 23 of the frame 12. The housing 22 extends through the opening 23 at an end 26 adjacent the splined disc 13 and contains a circumferential groove 27 for receiving a split ring 28 to hold the housing in the opening.

A movable member such as retractor rod 29 extends through the housing 22 and a hole 32 in the end 26 of the housing where it is connected by insertion of a flanged head 33 in a slot 34 in the splined disc 13 or by other arrangements well known in the art.

A cylindrical sleeve 35 is interposed between the retractor rod 29 and the housing 22. The sleeve 35 has an outwardly extending flange 36 at the outer or left end of the adjuster assembly 11 as illustrated in FIGS. 1 and 3. The flange 36 is located for engagement with the end of a helical coiled retractor spring 37 which is housed inside the housing 22 concentrically surrounding the sleeve 35 and engaging the spring retaining member or inner end 26 of the housing at the right of the adjuster assembly 11 (as viewed in FIGS. 1 and 3).

A ring 38 having an outer diameter substantially equal to the inner diameter of the housing 22 and an inner diameter less than the diameter of the flange 36 is mounted in sliding engagement in the housing for engagement with the flange 36 and a retaining split washer 39 mounted in a circumferential slot 42 in the wall of the housing 22 for limiting retracting movement of the ring 38 and sleeve 35 in the outward direction or to the left as viewed in FIGS. 1 and 3 and providing an anchorage to hold the spring 37 in compression.

The sleeve 35 has an inner end 43 at the right end of the adjuster assembly 11 as viewed in FIGS. 1 and 3 with an opening 44 through which the retractor rod 29 extends. The inner end 43 of the sleeve 35 is spaced from the inner end 26 of the housing 22 a set-back distance indicated by the letter $h$ in FIGS. 1 and 3.

A tubular member which has a generally cylindrical shape such as drag tube 45 is interposed between the retractor rod 29 and the sleeve 35. The drag tube 45 is seated at an inner end 46 on the inner end 43 of the sleeve 35 and extends outwardly or to the left as viewed in FIGS. 1 and 3 from the sleeve. The drag tube 45 has a series of axially spaced apart perforations or holes 47 in the wall connected by separating portions or tensile bar sections 48. The tensile bar sections 48 are also positioned at axially spaced-apart positions as shown in FIGS. 1 and 3. The effective cross sectional area of the tensile bar sections 48 is a function of the diameter of the holes 47 and may be increased by decreasing the size of the holes or decreased by increasing the size of the holes. In addition the effective area may be reduced by a groove 49 extending between the holes 47 and in the embodiment shown the groove extends axially the length of the drag tube 45.

The retractor rod 29 has a tube expansion member such as a ball 52 mounted on the outer end by a nut 53 threaded on the end of the retractor rod. The ball 52 is generally spherical in shape and has a diameter slightly greater than the inner diameter of the drag tube 45 so that as the ball 52 is pulled through the tube it will expand the tube as shown in FIGS. 1 and 2.

When the brake is operated by communicating hydraulic fluid to piston 17 and the latter displaces the splined disc 13 towards the lining carrier 14, the retractor rod 29 is pulled axially through the hole 32 in the end 26 of the housing 22. The sleeve 35 is pulled in the same direction overcoming the force of the retractor spring 37 and moving the sleeve until the inner end 43 engages the stop or inner end 26 of the housing 22. If there is no appreciable wear or other conditions materially changing the release clearance between the selectively engageable parts including the splined disc 13 and lining carrier 14 while these members are engaged, then the retractor rod 29 will not be axially displaced and amounts sufficient to cause relative change in the position of the rod within the sleeve 35.

The adjuster assembly 11 is designed so that the set-back $h$ indicated in FIGS. 1 and 3 is equal to the maximum allowable release clearance between the engageable parts of the brake. So long as the release clearance does not exceed an amount indicated by the dimension $h$, the relative position of the ball 52 within the drag tube 45 will remain the same.

As the brake wears the release clearance between the retracted position of the splined disc 13 and the other engageable parts of the brake tends to increase progressively. The existence of this condition is automatically sensed in this mechanism because the retractor rod 29 and the splined disc 13 may be displaced for whatever distance necessary to bring about brake engagement regardless of wear. Accordingly whenever the splined disc 13 and rod 29 are moved through a distance greater than that equal to the set-back distance $h$ in order to engage the brake parts the ball 52 will be forced through the drag tube 45 and expand the drag tube as shown in FIGS. 1 through 4.

As the ball 52 expands the drag tube 45 the "tensile bar" sections 48 between the holes 47 will be stressed in tension and ruptured at a predetermined adjustment load level. Progressive axial movement of the ball 52 in the drag tube 45 will result in the successive stressing and rupturing of the "tensile bar" sections 48. The cross sectional area of the "tensile bar" sections 48 may be varied as stated hereinbefore so that they will rupture when the expanding force exerted by the ball 52 on the tube 45 reaches a predetermined level. This can be independent of the yield strength of the drag tube 45 which in the present embodiment must be sufficient to withstand compressive stresses transmitted from the retractor rod 29 through the ball 52 to the outer end of the drag tube 45 and then through the tube to the other end which is seated on the inner end 46 of the sleeve 35.

The extent of the expansion of the tube 45 and the rupturing of the "tensile bar" sections 48 between the holes 47 is a function of the wear in the engageable parts of the brake of which the friction lining wear is the major part.

After the release of fluid pressure against the piston 17 the force of the retractor spring 37 against a flange 36 will return the sleeve 35 to the fully retracted position. Accordingly the retractor rod 29 will return the splined disc 13 to the retracted position. Then since the actuation forces have been removed the brake will revert to its free position. The retraction stroke is limited by the set-back distance $h$ through which the sleeve 35 can move and therefore the rod 29 is retracted only a distance equivalent to the set-back $h$. A new starting position is then established for the rod 29 and the splined disc 13 in which the release clearance between the engageable brake parts is again equal to the set-back distance $h$.

The progressive rupturing of the drag tube 45 and relocation of the starting position of the rod 29 and the splined disc 13 in this manner does not change the maximum deflection amplitude of the retractor spring 37. The retractor spring 37 deflection amplitude remains substantially the same upon retraction from the time the brake is new until the friction linings are entirely worn out.

When the brake is released the engagement of the ball 52 with the drag tube 45 is adequate to maintain the rod in any adjusted position. After the friction linings are worn to a point where replacement of the lining carrier 14 and other lining carriers is necessary, the drag tube 45 may be replaced simply by unscrewing nut 53 from the end of the retractor rod 29 and removing the ball 52. The drag tube 45 may then be pulled out of the sleeve 35 and replaced with a new tube.

Referring to FIG. 5 a modification is shown in which an adjuster assembly 54 is mounted in a torque frame 12' of a brake. The torque frame 12' carries a splined disc 13' in parallel axial alignment with a rotatable lining carrier 14'. The latter is in splined engagement at its outer periphery with a rotatable member which may be part of a wheel 15'. The splined disc 13' is in engagement at its inner periphery with keyways 16' connected to the torque frame 12' to prevent rotation thereof.

The brake is actuated by a hydraulic piston 17' mounted in a cylinder 18' which has a port 19' for connection to a source of hydraulic pressure for actuating the piston to urge the splined disc 13' into frictional engagement with the lining carrier 14' and other selectively engageable brake parts not shown. The brake shown in FIG. 5 is in the release condition with the engageable brake parts out of frictional engagement.

The adjuster assembly 54 includes a housing 55 mounted in a cylindrical opening 23' in the torque frame 12'. The housing 55 has a flange 56 at the outer end for engagement with the shoulder 25' in the cylindrical opening 23'. At the inner end 57 of the housing 55 a split ring 28' is mounted in a circumferential groove 58 in the outer surface of the housing to limit axial movement of the housing relative to the torque frame 12'.

The housing 55 has an opening 59 in the inner end 57 through which a retractor rod 29' extends towards the splined disc 13'. A flanged head 33' of the retractor rod 29' may be inserted in a slot 34' in the splined disc 13' to provide a connection between the rod and the splined disc.

A drag tube 62 is positioned around the retractor rod 29' and extends through the opening 59 towards the splined disc 13'. At the outer end of the drag tube 62 to the left as shown in FIG. 5 and outwardly extending flange 63 on the drag tube overlies a ring 64 which abuts a split washer 65 mounted in a circumferential groove 66 at the inner periphery of the housing 55. At the other end of the housing 55 an inner ring 67 abuts the inner end 57 of the housing and provides an anchorage against which a retractor spring 68 may bear. The spring 68 is caged in a preloaded compressed condition with the left end coil of the spring as viewed in FIG. 5 bearing against the ring 64.

At the outer end of the rod 29' which is the left end as viewed in FIG. 5 a spherical body such as a ball 52' is fastened on the rod by a nut 53'. The outer diameter of the ball 52' is slightly greater than the inner diameter of the drag tube 62 so that as it is pulled through the tube the tube wall will be expanded. The drag tube 62 has a series of axially disposed holes 47', separating portions such as tensile bar sections 48'. A groove 49' extending axially across the tensile bar sections 48' between the holes 47' may be provided to further reduce and control the cross sectional area of the tensile bar sections 48'.

The operation of the modification shown in FIG. 5 is similar to the operation of the adjuster assembly 11 shown in FIGS. 1 through 4 with the exception that the drag tube 62 is stressed in tension during the stretching of the tensile bar sections 48'. Furthermore the modification of FIG. 5 does not require a sleeve between the drag tube 62 and the housing 55. Instead of the sleeve moving with the drag tube 62 until it bottoms on the housing as in the construction of FIG. 1 the drag tube pulls the ring 64 to the right as shown in FIG. 5 through the setback distance h until it bottoms on a stop such as shoulder 69 of the housing 55.

Whenever the splined disc 13' and the rod 29' are moved through a distance greater than that equal to the set-back h in order to engage the splined disc 13', lining carrier 14' and the other engageable parts of the brake the ball 52' will be forced through the drag tube 62 and cause the respective tensile bar sections 48' to rupture. The extent of the rupturing will be equal to the wear of the friction linings on the lining carrier 14' and the other engageable brake parts. When the brake is released the retractor spring 68 will return the drag tube 62 to a position where the ring 64 bottoms on the retaining split washer 65. A new starting position is then established for the rod 29' and the splined disc 13' and the release clearance between the engageable parts of the brake remains equal to the set-back distance h.

When the brake linings need replacement the rod 29' can be removed from the splined disc 13' and pulled out of the housing 55 with the drag tube 62. The ball 52' can be removed by unscrewing the nut 53' and a new drag tube 62 may then be substituted for the drag tube which has been used and in which the tensile bar sections 48' are ruptured.

With this construction the thickness of the wall of the drag tube 62 may be determined in accordance with the strength requirements however the force required to rupture the tensile bar sections 48' may be determined independent of the thickness of the wall through calculating the cross sectional area of the tensile bar sections and selecting the diameter of the holes 47'. Further control of the cross section can be provided through the use of the groove 49' which will decrease the cross section and determine the position at which the sections 48' rupture.

Other modifications such as locating the perforations or holes in the drag tube at positions around the tube and having different size holes at different portions of the tube may be used in accordance with the present invention. It is also understood that other types of adjuster mechanisms as well as other brake or clutch actuating mechanisms may be used without departing from the invention.

I claim:

1. An adjuster assembly for regulating the release clearance between two selectively engageable parts such as friction or clutch parts to compensate for wear in such parts comprising an expansion member adapted for axial movement in response to actuation and release of said selectively engageable parts, a tubular member in expandable engagement with said expansion member mounted on said assembly for limited axial movement with said expansion member, said tubular member having perforations in the walls at axially spaced-apart positions along said tubular member providing separating portions between said perforations and means to arrest the movement of said tubular member so that said expansion member is moved axially relative to said tubular member stretching the walls of said tubular member and rupturing one of said separating portions at a time as said expansion member is moved axially relative to said tubular member whereby the relative axial movement of said expansion member is equal to the wear of such friction brake or clutch parts.

2. An adjuster assembly according to claim 1 wherein said expansion member has a generally spherical shape, said tubular member has a generally cylindrical shape and the diameter of said expansion member is slightly greater than the inner diameter of said tubular member.

3. An adjuster assembly according to claim 1 wherein said tubular member is supported at one end and engages said expansion member at the opposite end whereby said tubular member is under compression during movement of said expansion member relative to said tubular member.

4. An adjuster assembly according to claim 1 wherein said tubular member is supported at one end and engages said expansion member at the same end whereby said tubular member is stressed in tension during movement of said expansion member relative to said tubular member.

5. An adjuster assembly according to claim 1 wherein an axially extending groove in the wall of said tubular member extends between said perforations to provide reduced cross sections of said separating portions for rupturing under the force providing the actuation of said engageable parts.

6. An adjuster assembly according to claim 2 further comprising a housing secured in a torque frame, a sleeve member supporting said tubular member at one end, means supporting said sleeve member in said housing for relative axial movement, a retractor spring interposed between said sleeve member and said housing and being compressed between an anchorage on said housing and a spring retaining member at one end of said sleeve member, said means for arresting such axial movement of said tubular member further comprising stop means on said housing engageable with said sleeve member to limit axial movement of said sleeve member during actuation of said assembly to a predetermined distance prior to expansion of said tubular member by said expansion member, and retaining means on said housing for limiting retracting movement of said sleeve member by said retractor spring.

7. An adjuster assembly according to claim 2 further comprising a housing secured in a torque frame, a ring member supporting said tubular member at one end, means supporting said ring member in said housing for relative axial movement, a retractor spring disposed in said housing and being compressed between an anchorage on said housing and said ring member, said means for arresting such axial movement of said tubular member further comprising stop means on said housing engageable with said ring member to limit axial movement of said sleeve member during actuation of said assembly to a predetermined distance prior to expansion of said tubular member by said expansion member, and retaining means on said housing for limiting retracting movement of said ring member by said retractor spring.

8. An adjuster assembly according to claim 6 wherein said tubular member is seated on said sleeve member at one end and is engageable with said expansion member at an opposite end.

9. An adjuster assembly according to claim 7 wherein said tubular member is mounted on said ring member at one end and is engageable with said expansion member at the same end.

10. An adjuster assembly for regulating the release clearance between two selectively engageable parts such as friction or clutch parts to compensate for wear in such parts comprising an expansion member adapted for axial movement in response to actuation and release of said selectively engageable parts, a tubular member in expandable engagement with said expansion member mounted on said assembly for limited axial movement with said expansion member, said tubular member having spaced-apart perforations in the walls thereof providing axially spaced-apart separating portions along said tubular member between said perforations and means to arrest the movement of said tubular member so that said expansion member is moved axially relative to said tubular member stretching the walls of said tubular member and rupturing one of said separating portions at a time as said expansion member is moved axially relative to said tubular member whereby the relative axial movement of said expansion member is equal to the wear of such friction brake or clutch parts.

* * * * *